(12) United States Patent
Bonasia

(10) Patent No.: US 7,715,158 B2
(45) Date of Patent: May 11, 2010

(54) CIRCUIT INTERRUPTER WITH LIVE GROUND DETECTOR

(75) Inventor: Gaetano Bonasia, Bronx, NY (US)

(73) Assignee: Leviton Manufacturing Company, Inc., Melville, NY (US)

( * ) Notice: Subject to any disclaimer, the term of this patent is extended or adjusted under 35 U.S.C. 154(b) by 0 days.

(21) Appl. No.: 11/772,489

(22) Filed: Jul. 2, 2007

(65) Prior Publication Data

US 2008/0123227 A1    May 29, 2008

Related U.S. Application Data

(60) Provisional application No. 60/806,428, filed on Jun. 30, 2006.

(51) Int. Cl.
   *H02H 3/00* (2006.01)
   *H02H 9/08* (2006.01)
(52) U.S. Cl. ........................................................ 361/42
(58) Field of Classification Search .................... 361/42
   See application file for complete search history.

(56) References Cited

U.S. PATENT DOCUMENTS

| | | | |
|---|---|---|---|
| 3,891,894 A * | 6/1975 | Scarpino | 361/48 |
| 3,904,859 A | 9/1975 | Poncelet | |
| 4,016,488 A * | 4/1977 | Stevens | 324/510 |
| 4,376,243 A | 3/1983 | Renn et al. | |
| 4,466,071 A | 8/1984 | Russell, Jr. | |
| 4,595,894 A | 6/1986 | Doyle et al. | |
| 4,618,907 A | 10/1986 | Leopold | |
| 4,709,293 A | 11/1987 | Gershen et al. | |
| 4,851,782 A | 7/1989 | Jeerings et al. | |
| 4,939,495 A | 7/1990 | Peterson et al. | |
| 5,185,684 A | 2/1993 | Beihoff et al. | |
| 5,185,686 A | 2/1993 | Hansen et al. | |
| 5,202,662 A | 4/1993 | Bienwald et al. | |
| 5,223,795 A | 6/1993 | Blades | |
| 5,224,006 A | 6/1993 | MacKenzie et al. | |
| 5,432,455 A | 7/1995 | Blades | |

(Continued)

FOREIGN PATENT DOCUMENTS

CA    2224927    6/1998

(Continued)

OTHER PUBLICATIONS http://www.iaei.org/subscriber/magazine/06_a/roberts.html—*IAEI* Jan.-Feb. 2006—"Ideas"—3 pages—visited on Nov. 15, 2007.

(Continued)

*Primary Examiner*—Fritz M. Fleming
*Assistant Examiner*—Lucy Thomas
(74) *Attorney, Agent, or Firm*—Collard & Roe, P.C.

(57) ABSTRACT

A ground detector circuit in the form of a live ground detector circuit. This live ground detector circuit can be combined with a circuit interrupting device. The circuit interrupting device can have a grounding conductive path, and a set of contacts which are configured to break an electrical connection between input and output terminals on the circuit interrupting device when operated. The ground detector when combined with a circuit interrupter, triggers the circuit interrupter into a fault condition when the detector circuit detects the presence of a signal or a fault.

32 Claims, 7 Drawing Sheets

U.S. PATENT DOCUMENTS

| | | | |
|---|---|---|---|
| 5,434,509 | A | 7/1995 | Blades |
| 5,459,630 | A | 10/1995 | MacKenzie et al. |
| 5,477,412 | A | 12/1995 | Neiger et al. |
| 5,536,980 | A | 7/1996 | Kawate et al. |
| 5,600,524 | A | 2/1997 | Neiger et al. |
| 5,642,248 | A * | 6/1997 | Campolo et al. ............... 361/42 |
| 5,680,287 | A | 10/1997 | Gernhardt et al. |
| 5,689,180 | A | 11/1997 | Carlson |
| 5,706,155 | A | 1/1998 | Neiger et al. |
| 5,715,125 | A | 2/1998 | Neiger et al. |
| 5,729,417 | A | 3/1998 | Neiger et al. |
| 5,847,913 | A | 12/1998 | Turner et al. |
| 5,940,256 | A | 8/1999 | MacKenzie et al. |
| 5,946,179 | A | 8/1999 | Fleege et al. |
| 5,963,406 | A | 10/1999 | Neiger et al. |
| 5,963,408 | A | 10/1999 | Neiger et al. |
| 5,999,384 | A | 12/1999 | Chen et al. |
| 6,052,265 | A | 4/2000 | Zaretsky et al. |
| 6,088,205 | A | 7/2000 | Neiger et al. |
| 6,128,169 | A | 10/2000 | Neiger et al. |
| 6,163,188 | A * | 12/2000 | Yu ............................. 327/199 |
| 6,226,161 | B1 | 5/2001 | Neiger et al. |
| 6,246,556 | B1 | 6/2001 | Haun et al. |
| 6,246,558 | B1 | 6/2001 | Di Salvo et al. |
| 6,252,407 | B1 | 6/2001 | Gershen |
| 6,259,996 | B1 | 7/2001 | Haun et al. |
| 6,282,070 | B1 | 8/2001 | Ziegler et al. |
| 6,339,525 | B1 | 1/2002 | Neiger et al. |
| 6,381,112 | B1 | 4/2002 | DiSalvo |
| 6,407,893 | B1 | 6/2002 | Neiger et al. |
| 6,433,978 | B1 | 8/2002 | Neiger et al. |
| 6,437,953 | B2 | 8/2002 | Di Salvo et al. |
| 6,522,510 | B1 | 2/2003 | Finlay et al. |
| 6,611,406 | B2 | 8/2003 | Neiger et al. |
| 6,639,769 | B2 | 10/2003 | Neiger et al. |
| 6,734,769 | B1 | 5/2004 | Germain et al. |
| 6,771,152 | B2 | 8/2004 | Germain et al. |
| 6,813,126 | B2 | 11/2004 | Di Salvo et al. |
| 6,856,498 | B1 | 2/2005 | Finlay, Sr. |
| 6,864,766 | B2 | 3/2005 | Di Salvo et al. |
| 6,873,231 | B2 | 3/2005 | Germain et al. |
| 6,937,027 | B2 | 8/2005 | Koo et al. |
| 6,937,452 | B2 | 8/2005 | Chan et al. |
| 6,949,994 | B2 | 9/2005 | Germain et al. |
| 6,963,260 | B2 | 11/2005 | Germain et al. |
| 6,972,572 | B2 | 12/2005 | Mernyk et al. |
| 7,003,435 | B2 | 2/2006 | Kolker et al. |
| 7,026,895 | B2 | 4/2006 | Germain et al. |
| 7,031,125 | B2 | 4/2006 | Germain et al. |
| 7,042,688 | B2 | 5/2006 | Chan et al. |
| 7,049,910 | B2 | 5/2006 | Campolo et al. |
| 7,049,911 | B2 | 5/2006 | Germain et al. |
| 7,088,205 | B2 | 8/2006 | Germain et al. |
| 7,088,206 | B2 | 8/2006 | Germain et al. |
| 7,091,871 | B2 | 8/2006 | Howell et al. |
| 7,099,129 | B2 | 8/2006 | Neiger et al. |
| 7,133,266 | B1 | 11/2006 | Finlay |
| 7,164,563 | B2 | 1/2007 | Chan et al. |
| 7,173,799 | B1 | 2/2007 | Weeks et al. |
| 7,180,299 | B2 | 2/2007 | Mernyk et al. |
| 7,187,526 | B2 | 3/2007 | Di Salvo |
| 7,196,886 | B2 | 3/2007 | Chan et al. |
| 7,212,386 | B1 | 5/2007 | Finlay, Sr. et al. |
| 7,227,435 | B2 | 6/2007 | Germain et al. |
| 7,259,568 | B2 | 8/2007 | Mernyk et al. |
| 7,333,920 | B2 | 2/2008 | Kolker et al. |
| 7,365,621 | B2 | 4/2008 | Germain et al. |
| 7,400,477 | B2 | 7/2008 | Campolo et al. |
| 7,439,833 | B2 | 10/2008 | Germain et al. |
| 7,463,124 | B2 | 12/2008 | Di Salvo et al. |
| 7,492,558 | B2 | 2/2009 | Germain et al. |
| 7,551,047 | B2 | 6/2009 | Sokolow et al. |
| 7,558,034 | B2 | 7/2009 | Bonasia et al. |
| 2002/0008597 | A1 * | 1/2002 | Otsuka et al. ................. 333/33 |
| 2002/0135957 | A1 | 9/2002 | Chan et al. |
| 2004/0223272 | A1 | 11/2004 | Germain et al. |
| 2005/0002137 | A1 | 1/2005 | Germain et al. |
| 2005/0063535 | A1 | 3/2005 | Walbeck et al. |
| 2005/0286184 | A1 | 12/2005 | Campolo |
| 2006/0139132 | A1 | 6/2006 | Porter et al. |
| 2006/0171085 | A1 | 8/2006 | Keating |
| 2006/0181373 | A1 | 8/2006 | Germain et al. |
| 2006/0285262 | A1 | 12/2006 | Neiger |
| 2007/0014058 | A1 | 1/2007 | Chan et al. |
| 2007/0091520 | A1 | 4/2007 | Angelides et al. |
| 2007/0268635 | A1 | 11/2007 | Bonasia et al. |
| 2008/0007879 | A1 | 1/2008 | Zaretsky et al. |
| 2008/0013237 | A1 | 1/2008 | Moadel et al. |
| 2008/0123227 | A1 | 5/2008 | Bonasia |
| 2008/0186642 | A1 | 8/2008 | Campolo et al. |
| 2008/0248662 | A1 | 10/2008 | Bazayev et al. |
| 2009/0052098 | A1 | 2/2009 | Di Salvo et al. |

FOREIGN PATENT DOCUMENTS

| | | |
|---|---|---|
| WO | WO2005062917 | 7/2005 |

OTHER PUBLICATIONS

FIG. 1—Normal Circuit.
FIG. 2—Fatal Condition.
FIG. 3—Fatal Condition.
International Search Report for PCT/US02/072659 Dated Jul. 3, 2008.
International Written opinion issued on Jan. 15, 2009 for PCT US 0772659 Filed on Jul. 2, 2007.
Article 19 Amendment Filed on Oct. 3, 2007 In response to Search Report dated Jul. 3, 2008 for PCT US0772659.
"Tech. for Detecting and Monitoring Conditions that Could Cause Electrical Wiring Systems Fires," UL Underwriters Laboratories, Inc., Sep. 1995.

* cited by examiner

CIRCUIT INTERRUPTER WITH LIVE GROUND DETECTOR

This application claims priority pursuant to 35 U.S.C. 119 (e) from U.S. Provisional Application having Application No. 60/806,428 filed Jun. 30, 2006, the disclosure of which is hereby incorporated herein by reference in its entirety

BACKGROUND OF THE INVENTION

1. Field of the Invention

The present application is directed to a family of resettable circuit interrupting devices that includes Ground Fault Circuit Interrupters (GFCI's) and more particularly to GFCI'S which detect and interrupt the electrically conductive paths between the line side and a load side terminals of the GFCI upon detection of a voltage on the ground conductor of the GFCI.

2. Description of the Related Art

The electrical wiring device industry has witnessed an increasing call for circuit breaking devices or systems which are designed to automatically interrupt power to a load, such as a household appliance, a consumer electrical products and/or a branch circuits. In particular, electrical codes require electrical circuits in home bathrooms and kitchens to be equipped with Ground Fault Circuit Interrupters (GFCI). Presently available GFCI devices, such as the device described in commonly owned U.S. Pat. No. 4,595,894, which is incorporated herein in its entirety by reference, use a trip mechanism to break an electrical connection between the line side and the load side terminals of the device. Such devices are resettable after they are tripped by, for example, the detection of a ground fault. In the device discussed in the '894 patent, the trip mechanism used to cause the mechanical breaking of the circuit (i.e., the conductive path between the line side terminals and the load side terminals) includes a solenoid (or trip coil). A test button is used to both test the trip mechanism and the circuitry used to sense faults, and a reset button is used to reset the electrical connection between line and load side terminals.

Commonly owned U.S. Pat. No. 6,282,070 which is incorporated herein in its entirety by reference, describes a family of resettable circuit interrupting devices capable of locking out the reset portion of the device if the circuit interrupting portion is non-operational or if an open neutral condition exists and is capable of breaking electrical conductive paths independent of the operation of the circuit interrupting portion. Such devices are connected to external wiring so that phase and neutral line wires are connected to the phase and neutral line side connections and the phase and neutral load side wires are connected to the phase and neutral load side connections. In addition, in installations where there is a ground wire, the ground wire is connected to the ground terminal on the GFCI. When an installer connects a GFCI to a two-wire system, the installer will normally first connect the neutral terminal on the GFCI to the neutral wire and the phase terminal of the GFCI to the phase wire. However, instances may occur where the ground terminal of the GFCI is not properly connected to the grounding conductor of the electrical system and could be connected to the hot conductor instead. This mis-wiring may occur through a mistake by the installer at the receptacle or by a wiring error in the building system itself. For example, when the building was first wired, the color coding of connecting the black wire to the phase of the power source and the white wire to neutral or ground of the power source was not followed. If the installer does not verify that the building is wired correctly, as should be done with any electrical installation, the latter may occur. If a person inserts a three-wire plug of an appliance with a grounded metal case into the receptacle on the GFCI, the shell of the appliance will be connected to 120 volts through the grounding wire. Since, by the NEC code requirement, the grounding wire is never interrupted by any wiring device including a GFCI, the potential exists that a user of the appliance can be severely shocked. What is needed is a GFCI which will trip when the grounding conductor is connected to a voltage source.

SUMMARY OF THE INVENTION

This invention relates to a circuit interrupter with input and output conductors, a grounding conductor, and a switch to break the connection between the input and output conductors. In addition, the circuit interrupter includes a sensing circuit coupled to a control circuit which, in turn, is coupled to the switch. The sensing circuit causes the control circuit to open the switch when there is a voltage on the grounding path that is not at the grounding potential. In one embodiment the control circuit is integrated with a control circuit for a fault circuit interrupter. In another embodiment the control circuit is formed separate from the control circuit for a fault circuit interrupter.

DESCRIPTION OF THE PREFERRED EMBODIMENT(S)

Figure 1:
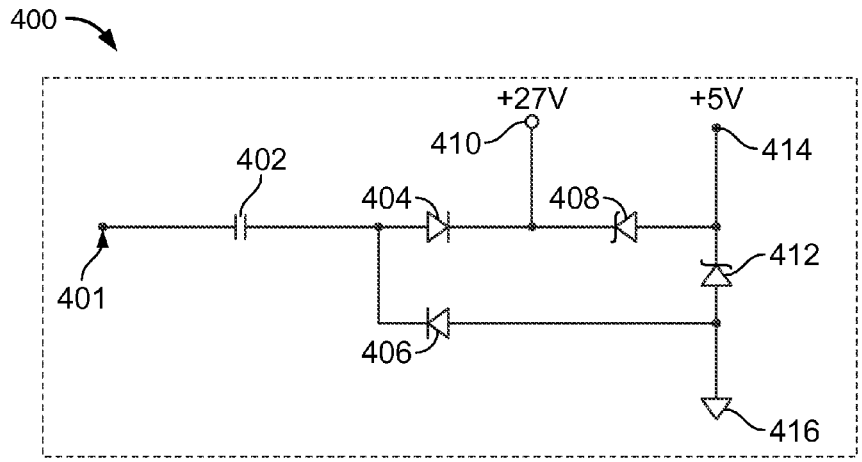
FIG. 1 is a schematic block diagram of a power supply for a sensing circuit.

The present invention relates to various types of circuit interrupting devices in combination with a circuit for detecting a hot ground condition and capable of breaking at least one conductive path between the line side conductors or terminals and the load side conductors or terminals of the device. The conductive path is typically divided between a line side that connects to supplied electrical power and a load side that connects to one or more loads. The various devices in the family of resettable circuit interrupting devices include: ground fault circuit interrupters (GFCI's), arc fault circuit interrupters (AFCI's), immersion detection circuit interrupters (IDCI's), appliance leakage circuit interrupters (ALCI's) and equipment leakage circuit interrupters (ELCI's). For the purpose of the present embodiment, the structure or mechanisms used in the circuit interrupting devices, shown in the drawings and described herein, are shown by way of example as being incorporated into a GFCI receptacle suitable for installation in a single-gang junction box used in, for example, a residential electrical wiring system. However, the circuit according to the present invention can be included in any of the various devices in the family of resettable circuit interrupting devices.

The GFCI receptacles described herein have line and load phase (or power) connections, line and load neutral connections and user accessible load phase and neutral connections. In addition, the GFCI receptacles also have a connection to the grounding conductor of the electrical system. The connections permit external conductors or appliances to be connected to the device. Examples of such connections include binding screws, lugs, terminals, wires, and external plug connections. Examples of a GFCI receptacle or related GFCI receptacles are found in U.S. Pat. No. 6,282,070.

In one embodiment, the GFCI receptacle has, in combination with a circuit for detecting a voltage on the grounding conductor of the GFCI (also referred to as a hot ground condition), an interrupter to break the electrical connection between the line and load terminals of the GFCI. The GFCI can further comprise a circuit interrupter and a reset assembly. In addition, the GFCI can optionally have a reset lockout assembly.

The circuit interrupter and reset assembly described herein may use electromechanical components to break (open) and make (close) one or more conductive paths (See FIGS. 4-6) between the line and load sides of the device. However, electrical components, such as solid state switches and supporting circuitry, can be used to open and close the conductive paths. (See FIG. 7). Generally, the circuit interrupter is used to automatically break electrical continuity in one or more conductive paths between the line and load sides upon the detection of a predetermined condition, which in the embodiments described is a ground fault. The reset assembly is used to close the conductive paths.

If the optional reset lockout assembly is incorporated into the GFCI, the reset assembly is used to close the open conductive paths if it is not disabled by the reset lockout assembly. In this configuration, the operation of the reset and reset lockout assemblies is in conjunction with the operation of the circuit interrupter, so that electrical continuity in open conductive paths cannot be reestablished if the circuit interrupter is non-operational, if an open neutral condition exists and/or if the device is reverse wired.

In addition, an independent trip assembly may also be optionally incorporated into the GFCI. The independent trip assembly interrupts electrical continuity in one or more conductive paths independently of the operation of the circuit interrupter. Thus, in the event the circuit interrupter is not operating properly, the device can still be tripped.

The above-described features can be incorporated in any resettable circuit interrupting device, but for simplicity the description herein is directed to a GFCI receptacle.

Figure 3:
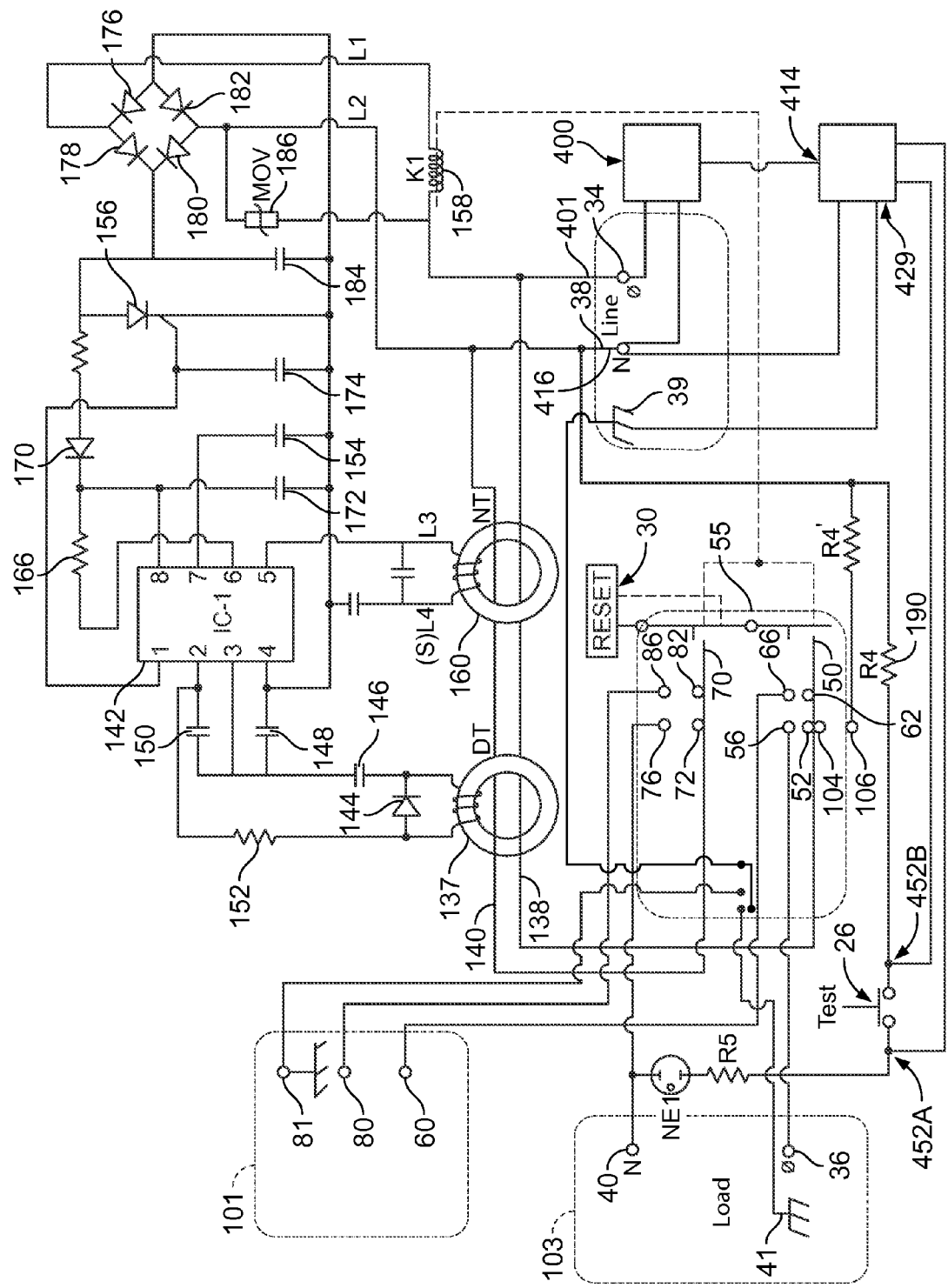
FIG. 3 is a schematic diagram of a circuit for detecting ground faults and resetting the GFCI device including the sensing circuit shown in FIG. 1.

Referring to FIG. 1, there is shown a schematic wiring diagram of a power supply for generating plus 5 volts DC and plus 27 volts DC. This entire power supply 400 is also shown in FIG. 3 as well. Input terminal 401, which is coupled to receive 120 volts AC, is connected through a capacitor 402 to the anode terminal of diode 404 and the cathode terminal of diode 406. The cathode terminal of diode 404 is connected to the cathode terminal of zener diode 408 and to output terminal 410 which supplies plus 27 volts. The anode terminal of zener diode 408 is connected to the cathode terminal of zener diode 412 and to terminal 414 which supplies plus 5 volts. The anode terminals of diodes 406 and 412 are connecter together and to ground terminal 416. Terminal 400 is connected to terminal 34 of the GFCI (see FIG. 3) and terminal 416 is connected to terminal 38, also of FIG. 3.

Figure 2:
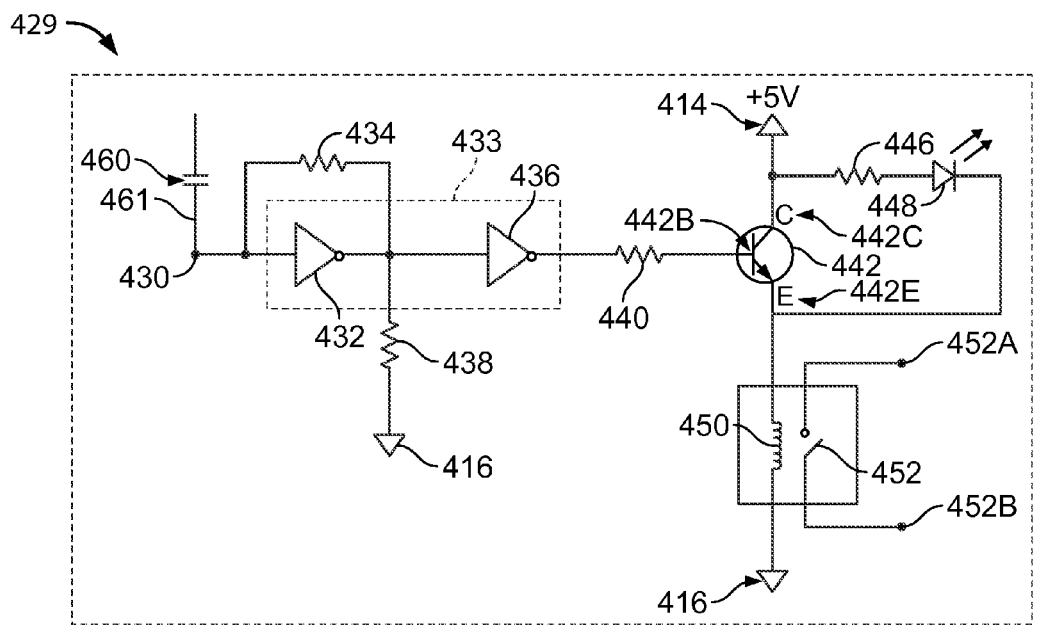
FIG. 2 is a schematic diagram of a sensing circuit.

FIG. 2 shows the sensing circuit 429 of the present embodiment. Input terminal 430 is coupled to the grounding conductor of the electrical system 461. Input terminal 430 is then connected to the input of an inverter 432 and a resistor 434 is connected between the input and output of the inverter 432. For the purposes of the sensing circuit shown, both inverters 432 and 436 may be incorporated into a single chip 433. By way of example, a hex inverter, such as an MC14069UB may be used for this purpose. Optionally, the sensing circuit could also be integrated with the control circuit described above in a single IC chip or microprocessor (See FIGS. 7-9). The output of inverter 432 is connected to the input of inverter 436 and to the neutral conductor 416 through resistor 438. Inverter 436 can be used for removing noise from the signal that is passed from inverter 432. Alternatively, and/or additionally inverter 436 can be used as a logic gate. Both inverter 432 and inverter 436 can be integrated into a single chip 433.

In this case, when input 430 does not receive any signal resulting from a hot ground condition, there is no signal input into inverter 432. Inverter 432 passes a 5 V DC current into the input of inverter 436. Inverter 436 then passes a low or no current into transistor 442 which keeps switch 452 open. However, when input 430 receives a signal indicating a hot ground condition, this signal is passed into the input of inverter 432. The resulting output from inverter 432 is a low voltage condition or no voltage. Since this output is fed into inverter 436, the resulting output is in the form of 5 V DC current which is fed into the base 442b of transistor 442.

The collector 442C of transistor 442 is connected to a plus 5 volts potential such as is present at terminal 414 of FIG. 1, and through a resistor 446 in series with a light emitting diode 448 to the emitter terminal of transistor 442. The emitter terminal of transistor 442 is also connected to the neutral terminal 416 of FIG. 1 through relay coil 450 operatively coupled to a set of contacts 452. When base 442b of transistor 442 is energized, this 5V DC current is passed through coil 450 thereby causing a triggering of switch 452 to move switch 452 into a closed position.

To ensure the detection of a hot ground condition, the inverter 432 has is a MOSFET inverter which has a high gain. For example, in some circumstances a gain can be referred to as a high gain if the amplification is at least 1000×. By connecting the input of the inverter to the output with a high impedance such as a 10 meg. ohm resistor, such as resistor 434, the gain of the inverter will be almost exponential and will trigger with small signals such as in the form of a signal in the range of microvolts or even lower. The input terminal 430 is placed in close proximity, but not directly connected to the ground strap of the GFCI. For example, the conductor 461 to the terminal 430 can be wrapped around the metal ground or mounting strap of the GFCI. In another embodiment, the terminal 430 is coupled to the ground strap of the GFCI through a 0.002 uF capacitor 460.

The contacts 452 (including contacts 452a and 452b) are connected in parallel with the test switch 26, (see FIG. 3), to cause a test function and open the load and face terminal connections when circuit 429 is activated. This occurs during a hot ground condition. Thus, activation of circuit 429 to cause the operation of the relay contacts 452 (452a, 452b) will have the same effect as a person depressing the test button 26 on the GFCI. This action then trips the circuit and removes power from both the face terminals 101 and the rear load terminals 103 shown in FIG. 3.

These circuits 400 and 429 can be coupled to different fault circuits such as a GFCI, an AFCI or any other type of circuit which where this circuit would be applicable. For example, power circuit 400 and ground sensor circuit 429 can in at least one embodiment be coupled to a standard ground fault circuit interrupter (GFCI). FIGS. 3-6 disclose some of the general components of a GFCI.

For example, FIG. 3 shows line input terminals 34, 38 and 39, wherein input terminal 34 is the phase or hot terminal, input terminal 38 is the neutral terminal and terminal 39 is an earth ground terminal. These input terminals are then connected to output terminals 101 and 103. Output terminals 101 include face terminals 60, 80 and 81 with face terminal 60 being a phase or hot terminal, face terminal 80 being a neutral terminal and face terminal 81 being a ground terminal. Output terminals 103 are load terminals and include phase terminal 36, neutral terminal 40 and ground terminal 41. These output terminals 101 and 103 can be electrically isolated from input terminals 34, 38 and 39 via a switching mechanism such as that shown by main switch mechanism 55 which includes the mechanical switching elements shown in greater detail in FIGS. 4-6. Also shown in FIG. 3 is a control circuit or integrated circuit 142 which is coupled to coils 137 and 160 for receiving information relating to a ground fault, as well as an output for sending a current to SCR 156 to trigger SCR 156. Upon the sensing of a fault condition, or upon the initiation of a test sequence, additional power flows through coil 158 causing a trip condition and isolating the output terminals 101 and 103 from the input terminals.

In addition, in this embodiment, power supply 400 which is shown in FIG. 1 is shown as being coupled to a power input via contact 401 coupling to phase input connection 34. In addition, neutral contact 416 is then coupled to neutral path 38 as well. In addition live ground detection circuit 429 has its neutral output 416 connected to neutral output 416 of power circuit 400, wherein this connection is also connected to neutral path 38. Ground line 461 which includes capacitor 460 is shown as connected to earth ground connection or path 39.

For example, a standard GFCI has a switch to turn off power to any one of the face terminals or load terminals in the device. When ground sensor circuit 429 detects the presence of a signal being fed into input terminal 430, as stated above, this situation creates the simulation of a test condition. Upon the triggering of the test condition, a switch such as a mechanical switch or a solid state switch is tripped.

Figure 4:
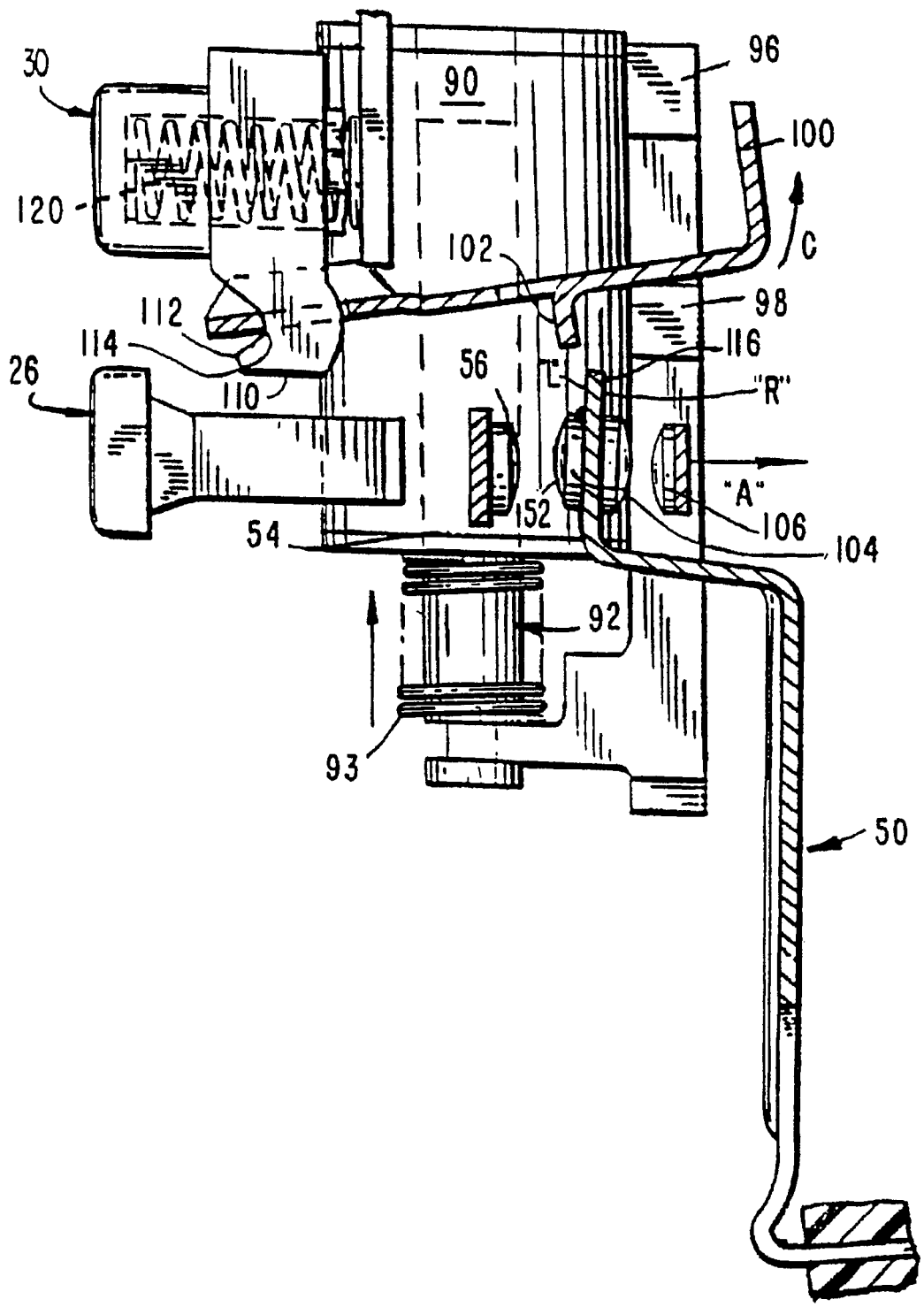
FIG. 4 is a side view of an example of contacts relating to a GFCI with the test button being pressed.
Figure 5:
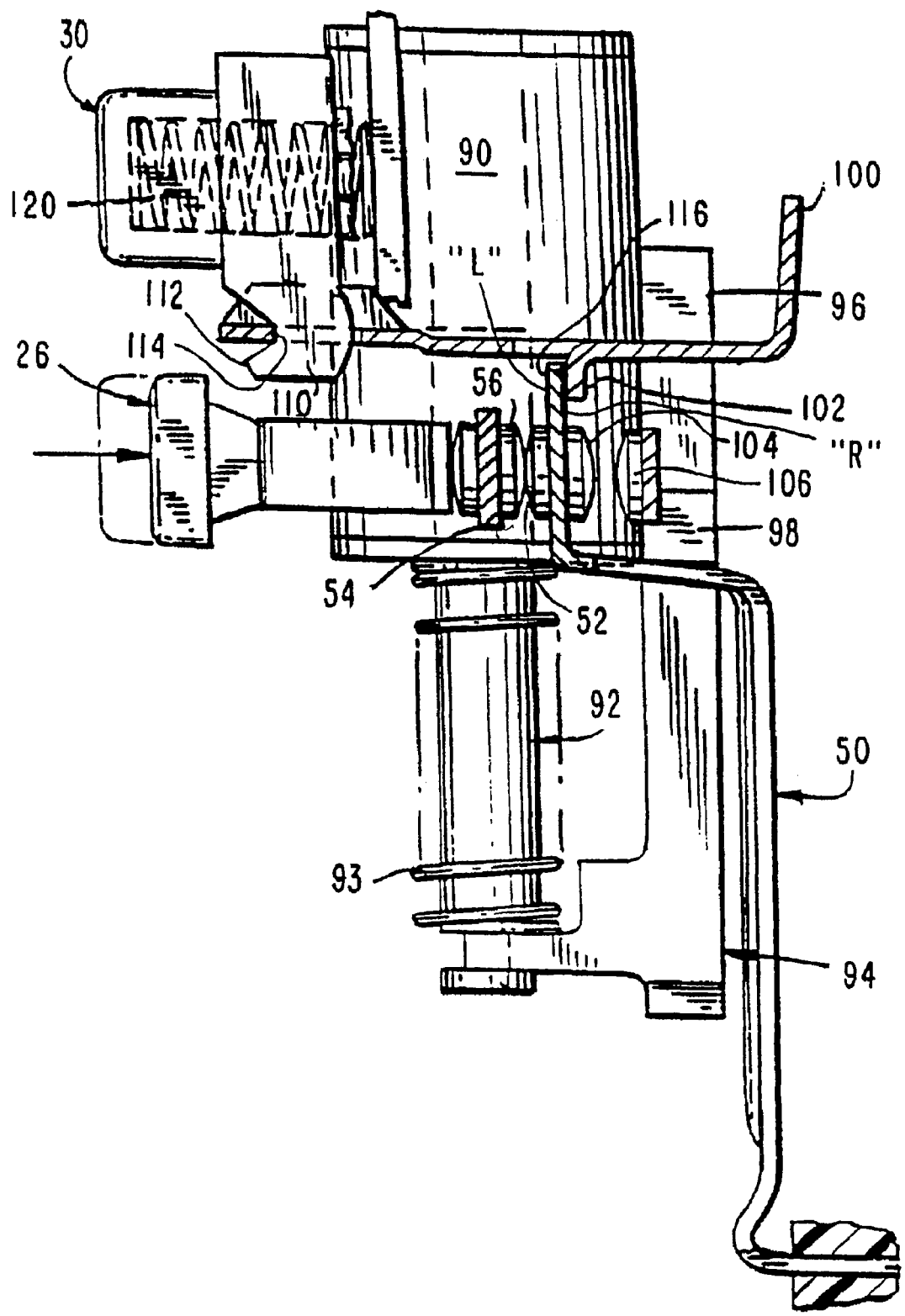
FIG. 5 is a side view similar to that of FIG. 4 in a tripped condition.
Figure 6:
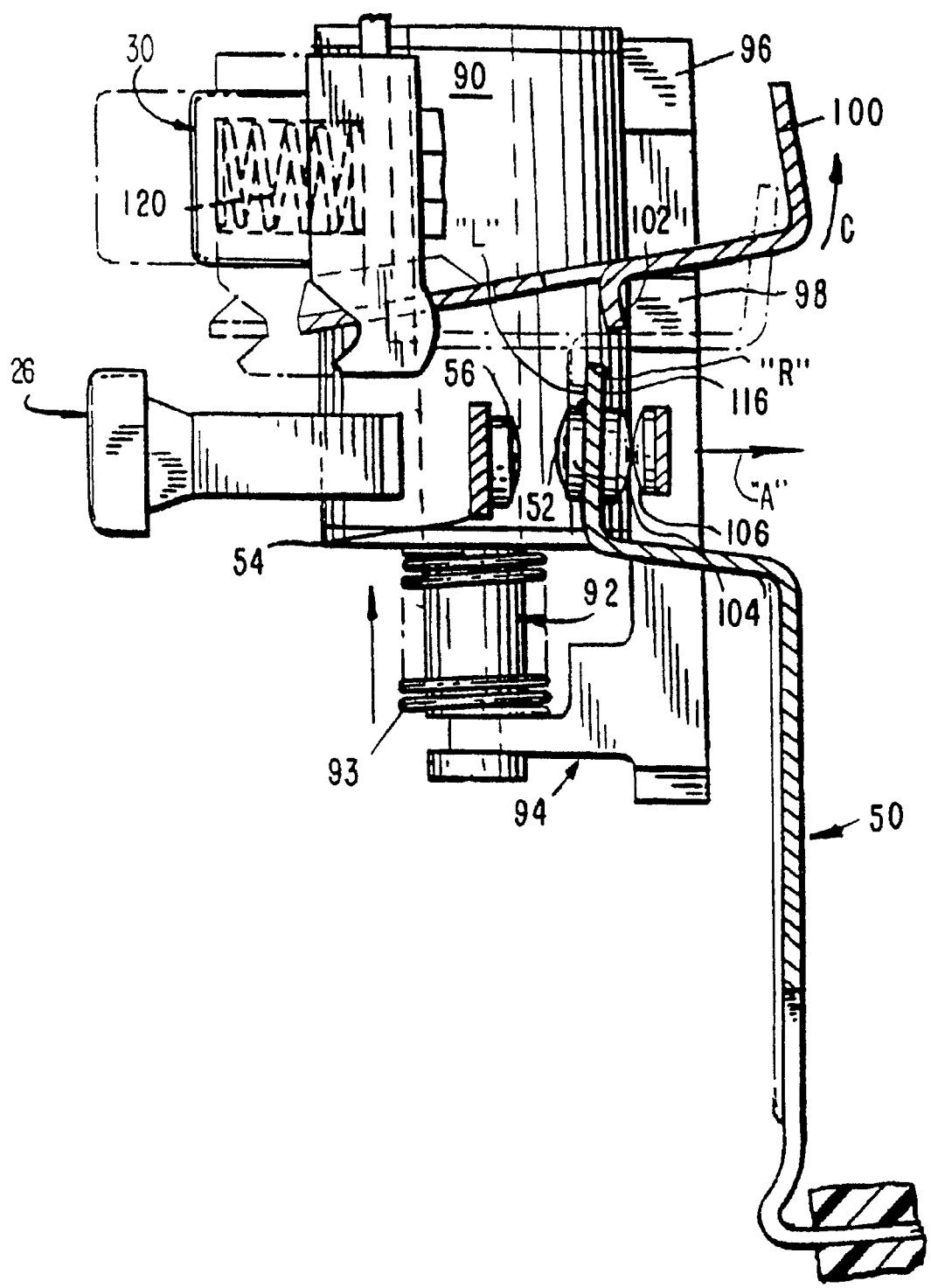
FIG. 6 is a side view of the device with the reset button being pressed.

Referring to FIGS. 4-6, the conductive path between the line phase connection 34 and the load phase connection 36 includes contact arm 50 which is movable between stressed and unstressed positions, movable contact 52 mounted to the contact arm 50, contact arm 54 secured to or monolithically formed into the load phase connection 36 and fixed contact 56 mounted to the contact arm 54. The user accessible load phase connection for this embodiment includes a terminal assembly having two binding terminals which are capable of engaging a prong of a male plug inserted there between. The conductive path between the line phase connection 34 and the user accessible load phase connection includes, contact arm 50 with a movable contact, a contact arm secured to or monolithically formed into a terminal assembly, and a fixed contact mounted to the contact arm. These conductive paths are collectively called the phase conductive path. The same general arrangement same applies to the neutral conductive path or if necessary a ground conductive path.

Referring to FIG. 5, the circuit interrupter has a control circuit capable of sensing faults, e.g., current imbalances, on the hot and/or neutral conductors. The coil assembly 90 is activated in response to the sensing of a ground fault by, for example, the control circuitry shown in FIG. 3 which includes a differential transformer that senses current imbalances between the neutral and phase conductors.

The reset assembly includes reset button 30, movable latching members 100 connected to the reset button 30, latching fingers 102 and reset contacts 104 and 106 which temporarily activate the circuit interrupter when the reset button is depressed, when in the tripped position.

The movable latching member 102 is, in this embodiment, common to each portion (i.e., the circuit interrupter, reset and reset lockout assemblies) and is used to facilitate the making, breaking or locking out of electrical continuity of one or more of the conductive paths. Alternatively, the live ground detector circuit 429 can be incorporated into a solution having solid state switching where there is no mechanical switch between each line.

Upon energization of trip coil 158 due to a line to ground fault condition, the contacts of the ground fault circuit interrupter are opened which respectively open the phase and neutral lines between the line, load and face receptacle. A push-button 26 and resistor 190 are part of a test circuit which bypasses the transformers 137 and 160.

Figure 7:
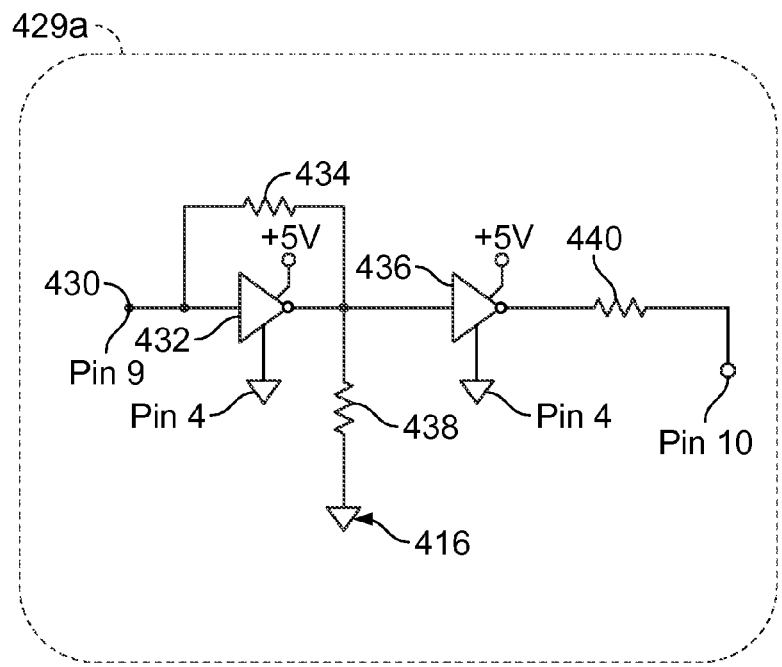
FIG. 7 is a schematic block diagram of a second embodiment of the live ground detector.
Figure 8:
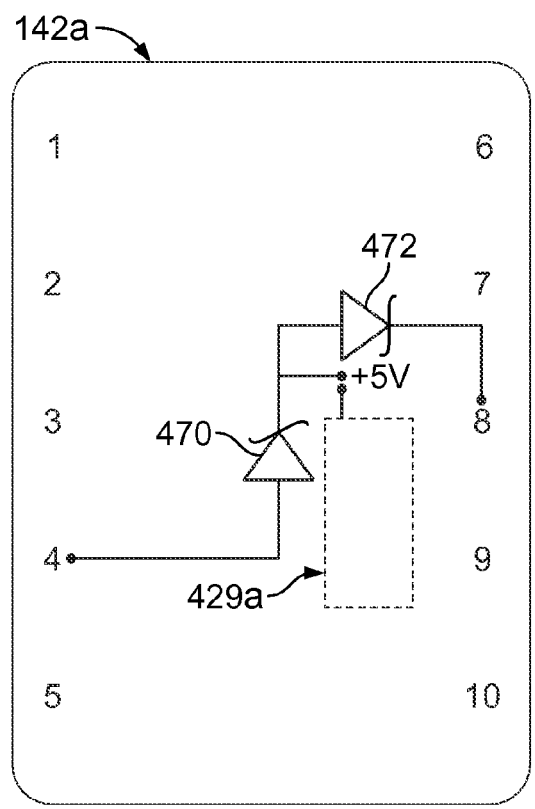
FIG. 8 is a schematic block diagram of a second embodiment of an integrated circuit for use with a GFCI.

FIG. 7 shows another embodiment of the sensing circuit. With this design, there is a ground sensing circuit 429a that is integrated into a modified integrated circuit 142a shown in FIG. 8. Ground sensing circuit 429a includes input 430, inverter 432, resister 434, inverter 436, resister 438, connection end 416 and resistor 440 as shown in FIG. 2. However, this modified ground sensing circuit 429a, does not need to include any of the additional components shown in FIG. 2. This is because many of these components can be handled by the integrated circuit 142a or the entire GFCI circuit shown in FIG. 8.

Integrated circuit 142a includes at least one additional pin such as pin 9, and can include additional pins such as pin 10. Pin 9 on integrated circuit 142a corresponds to input 430, wherein this input is coupled to a ground line 461. Power can be supplied to modified ground sensing circuit 429a from integrated circuit 142a. In at least one embodiment, such as that shown in FIG. 8, modified ground sensing circuit 429a receives a power input of 5 V DC. In contrast, integrated circuit 142a receives 27V DC which is input into pin 8 of IC 142a. Therefore, the power input into modified ground sensing circuit 429a can be modified via a zener diode 470. Another zener diode 472 is also placed between the 5 V DC connection and the circuit ground which is connected to pin 4 of integrated circuit 142a.

Figure 9:
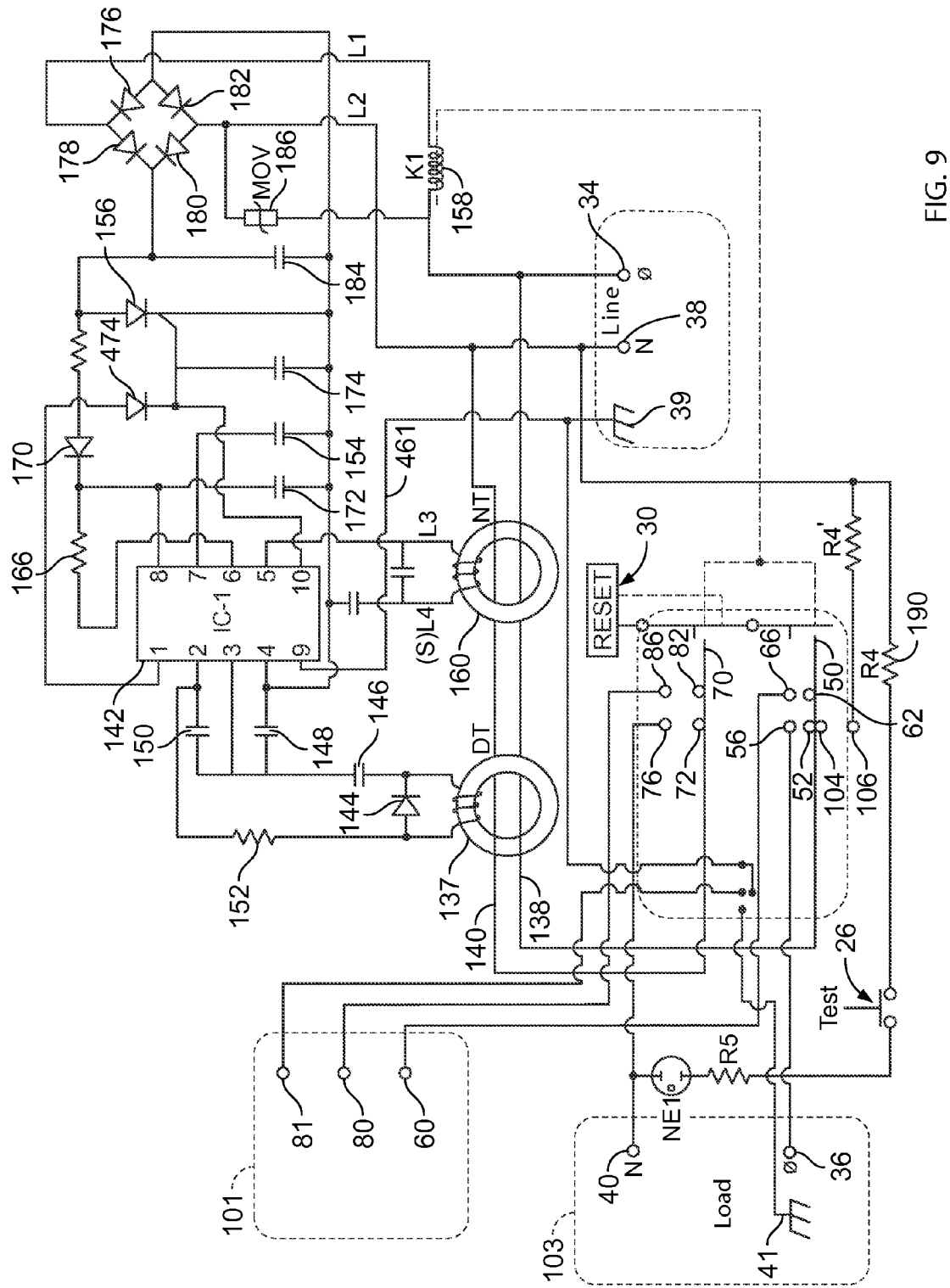
FIG. 9 is a schematic block diagram of a second embodiment of the circuit for detecting ground faults.

FIG. 9 shows this additional design incorporated into a GFCI circuit. With this circuit, modified IC 142a or a control circuit is shown having the output of pin 9 connected to the input of earth ground 39. In addition, the output of pin 10 extends into a line having a diode 474 wherein this connection feeds into SCR 156. When modified ground sensing circuit 429a detects a signal into input 430, through pin 9, this results in a signal being fed into inverter 432 which results in a null signal being sent into the input of inverter 436. The result of this null signal being input into inverter 436 results in a 5 V or similar output from inverter 436 which is then passed out from pin 10 and eventually into SCR 156. Upon this occurrence, SCR 156 creates a short causing an increase in current passing through coil 158 resulting in a ground fault or simulated ground fault condition, resulting in the opening of the circuit and the removal of contacts and the isolation of face terminals 101 and load terminals 103 from the power input terminals.

Thus, with this design, a live ground detector such as live ground detectors 429 and 429a prevent the improper wiring of a circuit which may result in an unauthorized bypass of a sensing circuit. This live ground detector thereby results in an additional safety feature for a sensing circuit such as a ground fault sensing circuit.

While there have been shown and described and pointed out the fundamental novel features of the invention as applied to the preferred embodiments, it will be understood that various omissions and substitutions and changes of the form and details of the method and apparatus illustrated and in the operation may be done by those skilled in the art, without departing from the spirit of the invention.

What is claimed is:

1. A circuit interrupter comprising:
    at least one input conductor;
    at least one output conductor;
    at least one grounding conductor having an input side and an output side;
    a switch coupled between said at least one input conductor and at least one output conductor, said switch being coupled along said grounding conductor and being configured to disconnect said input side from said output side;
    a sensing circuit configured to detect both a around fault and also to determine whether said grounding conductor is at a voltage potential not equal to the voltage potential of terrestrial earth, said sensing circuit comprising an integrated circuit having at least one pin coupled to said at least one grounding conductor wherein said sensing circuit comprises a MOSFET inverter having an input with a high resistance, in communication with said at least one pin, wherein said at least one pin is configured to pass a voltage to said MOSFET inverter to allow said sensing circuit to determine whether the voltage present at said at least one pin is at a potential not equal to the voltage potential of terrestrial earth;
    a control circuit coupled to said switch and said sensing circuit;
    whereby, if said grounding conductor is at a voltage potential not equal to the voltage potential of terrestrial earth, said sensing circuit will cause said control circuit to automatically open said switch thereby disconnecting said input side of said grounding conductor from said output side of said grounding conductor.

2. The circuit interrupter of claim 1, wherein said sensing circuit is electrically bonded to said at least one grounding conductor.

3. The circuit interrupter of claim 1, wherein said sensing circuit is coupled to said at least one grounding conductor through a coupling having a capacitance.

4. The circuit interrupter of claim 3, wherein said coupling having a capacitance is a discrete capacitor.

5. The circuit interrupter of claim 3, wherein said sensing circuit is coupled to a conductor which is wrapped around, but not electrically bonded to, said grounding conductor wherein said conductor of said sensing circuit is configured to read said grounding conductor to determine the presence of an AC current in said grounding conductor.

6. The circuit interrupter of claim 3, wherein the capacitance has a value of not more than 0.002 microfarads.

7. The circuit interrupter of claim 1, wherein said MOSFET inverter is a first MOSFET inverter and wherein said sensing circuit further comprises:
    a first MOSFET inverter;
    a second MOSFET inverter in series with said first MOSFET inverter;
    a resistor in parallel with said first MOSFET inverter;
    a transistor coupled to said second MOSFET inverter; and
    a relay coupled to said transistor where said relay has an open state and a closed state,
    whereby when said relay is in said closed state said control circuit opens said switch.

8. The circuit interrupter of claim 7, where said resistor has a value of not less than 10 mega-ohms.

9. The circuit interrupter of claim 1, wherein the integrated chip is a microprocessor.

10. The circuit interrupter of claim 7, where said control circuit opens said switch when a predetermined condition is detected; and said relay creates said predetermined condition when said relay is in said closed state.

11. The circuit interrupter of claim 10, where said predetermined condition is selected from the group consisting of: a ground fault, an arc fault, an appliance leakage fault, an immersion fault and a test cycle.

12. The interrupter as in claim 1, wherein said input of said inverter is coupled to a resistor having a high impedance of at least 10 meg. Ohm.

13. The interrupter as in claim 1, wherein said inverter is a high gain inverter having an amplification output of at least 1000 times said input.

14. The circuit interrupter as in claim 5 wherein said grounding conductor is formed as a ground strap for a GFCI.

15. The circuit interrupter as in claim 1, further comprising an actuator comprising a coil for automatically opening said switch when said sensing circuit detects that said ground conductor is at a voltage potential that is not the same as terrestrial earth.

16. The circuit interrupter as in claim 1, further comprising an indicator in communication with said control circuit, said indicator being configured to indicate when a voltage at said grounding conductor is at a voltage potential not equal to the voltage potential of terrestrial earth.

17. The circuit interrupter as in claim 16, wherein said indicator is a light.

18. A circuit interrupter comprising:
    at least one input conductor;
    at least one output conductor;
    wherein said at least one input conductor comprises at least one grounding conductor and said at least one output conductor comprises at least one grounding conductor;
    a switch coupled between said at least one input conductor and at least one output conductor;
    a sensing circuit, comprising an integrated circuit having a pin, and configured to detect at least one of an arc fault or a ground fault, and also being configured to determine whether said grounding conductor is at a voltage potential not equal to the voltage potential of terrestrial earth, wherein said pin is capacitively coupled to said at least one grounding conductor, and
    comprising at least one MOSFET inverter having an input with a high resistance, and
    comprising at least one transistor, and at least one relay wherein said MOSFET inverter has a high gain; and a control circuit coupled to said switch and said sensing circuit;
    wherein, said sensing circuit detects whether said grounding conductor is at a voltage potential not substantially equal to the voltage potential of terrestrial earth, such that said voltage potential of said grounding conductor is not substantially equal to the voltage potential of terrestrial earth said sensing circuit will instruct said relay to automatically open said switch to electrically disconnect said at least one input conductor from said at least one output conductor.

19. The interrupter as in claim 18, wherein said input of said inverter is coupled to a resistor having a high impedance of at least 10 meg. Ohm.

20. The interrupter as in claim 18, wherein said inverter is a high gain inverter having an amplification output of at least 1000 times said input.

21. The circuit interrupter as in claim 18, further comprising an actuator comprising a coil for automatically opening said switch when said sensing circuit detects that said ground conductor is at a voltage potential that is not substantially the same as terrestrial earth.

22. The circuit interrupter as in claim 18, further comprising an indicator in communication with said control circuit, said indicator being configured to indicate when a voltage at said grounding conductor is at a voltage potential not equal to the voltage potential of terrestrial earth.

23. The circuit interrupter as in claim 22, wherein said indicator is a light.

24. A ground fault circuit interrupter comprising:
   at least one input conductor;
   at least one output conductor;
   at least one grounding conductor;
   a switch;
   a sensing circuit, comprising an integrated circuit having a pin, and configured to detect at least one of an arc fault or a ground fault, and also being configured to determine whether said grounding conductor is at a voltage potential not equal to the voltage potential of terrestrial earth, wherein said pin is coupled to said at least one grounding conductor and comprising at least one MOSFET inverter having an input with a high resistance, at least one transistor, at least one relay coupled to said at least one transistor wherein said at least one relay has an open state and a closed state, wherein when said at least one relay is in said closed state said control circuit opens said switch; and
   a control circuit coupled to said switch and said sensing circuit;
   a light coupled to said switch;
   wherein said sensing circuit is configured to instruct said control circuit to close said switch if said grounding conductor is at a voltage potential not equal to the voltage potential of terrestrial earth, wherein said sensing circuit will instruct said control circuit to automatically close said switch thereby lighting said light.

25. The interrupter as in claim 24, wherein said at least one relay is configured to selectively open said switch, wherein said input of said inverter is coupled to a resistor having a high impedance of at least 10 meg Ohm.

26. The interrupter as in claim 25, wherein said inverter is a high gain inverter having an amplification output of at least 1000 times said input.

27. The circuit interrupter as in claim 24, further comprising an actuator comprising a coil for automatically opening said switch when said sensing circuit detects that said ground conductor is at a voltage potential that is not the same as terrestrial earth.

28. A method for determining a live ground condition of a fault circuit interrupter comprising:
   a) sensing a voltage potential on a ground line via a sensing circuit having a MOSFET inverter having an input with a high resistance said sensing circuit being formed as a single integrated circuit and being configured to detect the presence of a ground fault said sensing circuit being configured to determine whether a grounding conductor coupled to said sensing circuit is at a voltage potential not equal to the voltage potential of terrestrial earth wherein said step of sensing a voltage potential comprises sensing a voltage potential from a pin on said integrated circuit;
   b) comparing said voltage potential on said ground line to a voltage potential of terrestrial earth; and
   c) providing indication when said voltage potential on said ground line does not equal a voltage potential of terrestrial earth.

29. The method as in claim 28, wherein said step of providing indication comprises disconnecting a line side of said ground line from a load side of said ground line via a switch.

30. The method as in claim 28, wherein said step of providing indication comprises lighting a light when a voltage potential on said ground line does not equal a voltage potential of terrestrial earth.

31. The method as in claim 28, wherein said step of sensing a voltage potential on a ground line comprises providing at least one transistor, and at least one relay coupled to said at least one transistor, wherein said at least one relay is configured to selectively open said switch, wherein said input of said inverter is coupled to a resistor having a high impedance of at least 10 meg Ohm.

32. An integrated circuit comprising:
   a) a plurality of pins configured to connect to electrical inputs;
   b) at least one circuit configured to determine the presence of a ground fault;
   c) at least one pin capacitively coupled to a ground line; and
   d) at least one circuit configured to detect when said ground line is at a voltage potential that is different from earth ground wherein said at least one pin is configured to pass said voltage potential to said circuit.

* * * * *